Jan. 23, 1968   E. L. JOHNSON   3,364,510
DRILL PRESS TAP ATTACHMENT
Filed Aug. 18, 1965   2 Sheets-Sheet 1
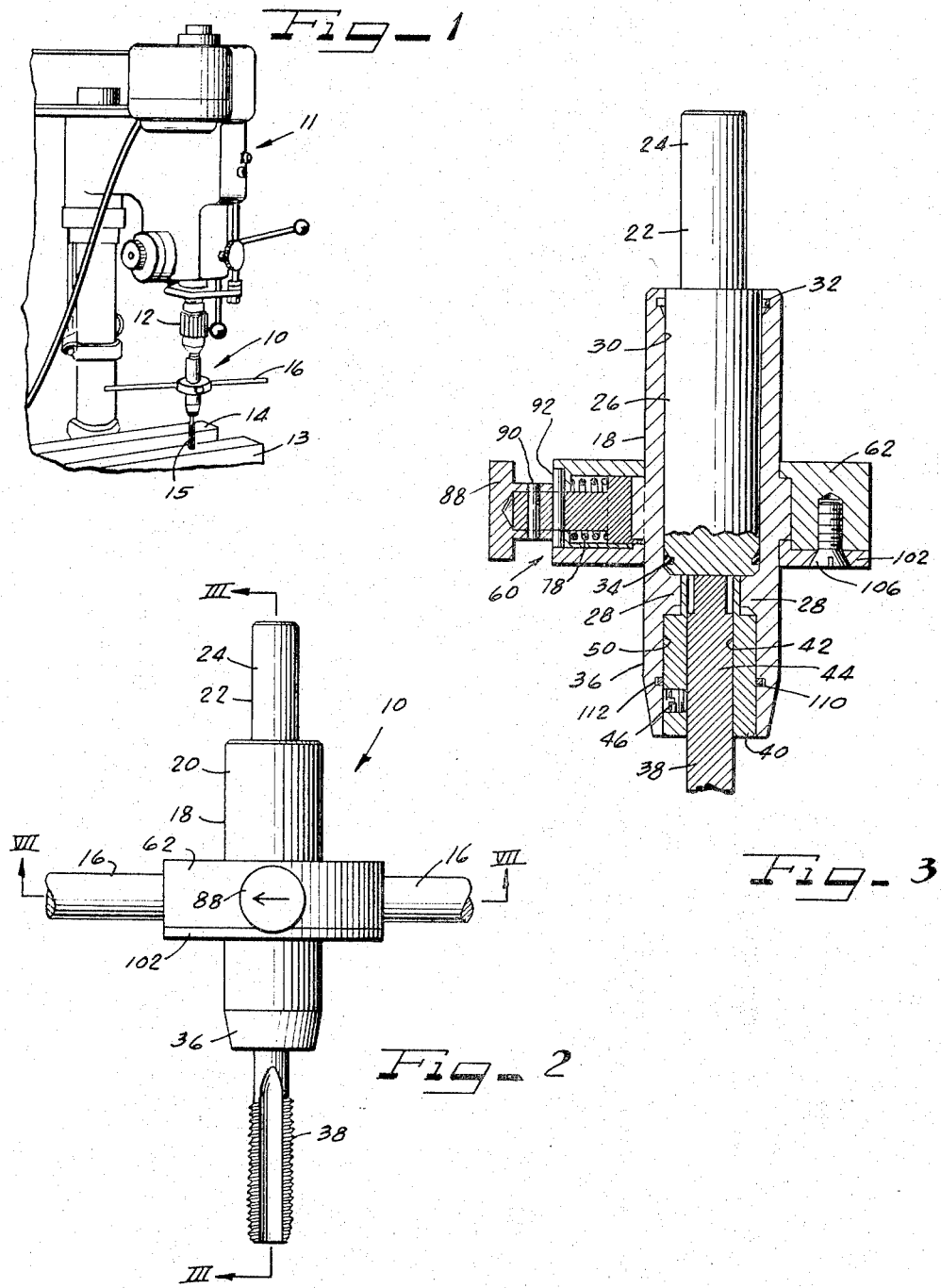
INVENTOR.
ELMER L. JOHNSON
ATTORNEYS Jan. 23, 1968  E. L. JOHNSON  3,364,510
DRILL PRESS TAP ATTACHMENT
Filed Aug. 18, 1965  2 Sheets-Sheet 2
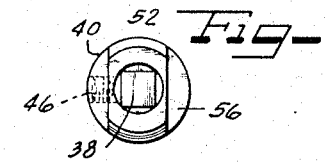
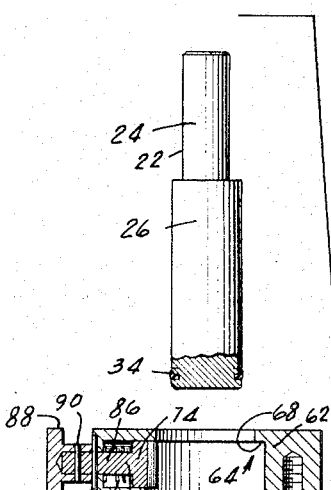
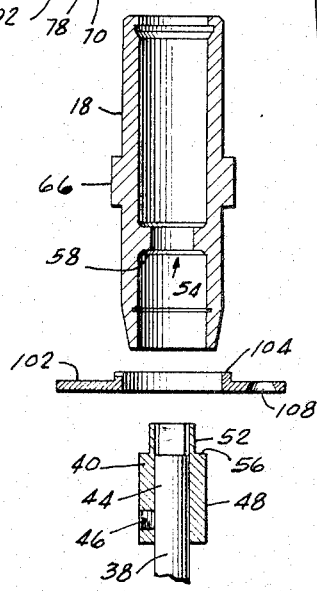
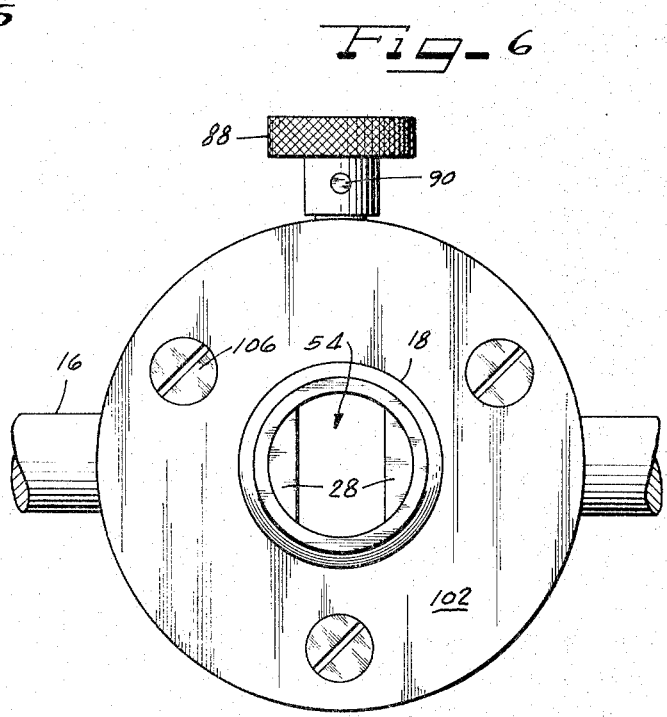
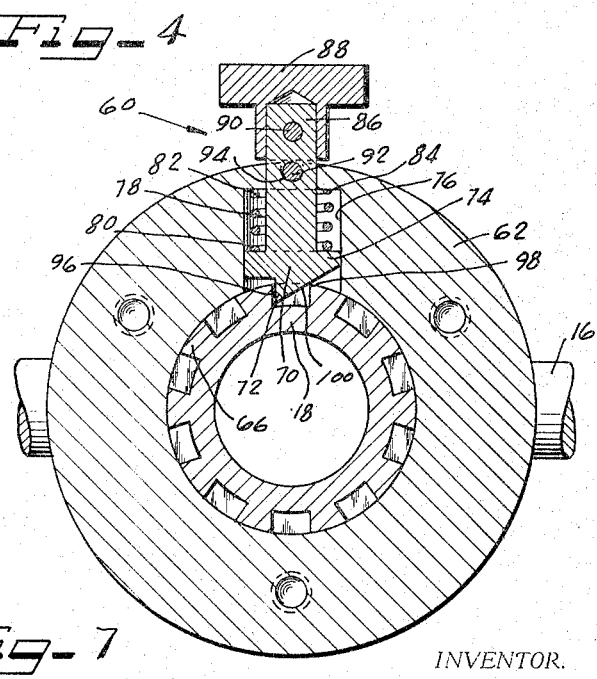
INVENTOR.
ELMER L. JOHNSON
BY
ATTORNEYS

United States Patent Office 3,364,510
Patented Jan. 23, 1968

3,364,510
DRILL PRESS TAP ATTACHMENT
Elmer L. Johnson, St. Charles, Ill., assignor to Johnson Manufacturing, Batavia, Ill., a co-partnership consisting of Mame Johnson and Elmer L. Johnson
Filed Aug. 18, 1965, Ser. No. 480,564
1 Claim. (Cl. 10—150)

ABSTRACT OF THE DISCLOSURE

A tapping tool for use with a drill press in tapping a workpiece held thereon comprising
a plunger having a guiding end and a shaft end rigidly mountable within a drill press,
a body member having a chamber at one end thereof with an inside diameter slightly larger than the diameter of the plunger guiding end to accommodate the latter close fit and ensure the rotation of said body member in alignment with respect to the plunger, the body member also including a keyway and a splined surface formed around the outer diameter of the body member,
a tap chuck, having a key at one end and a passageway, detachably insertable into the body member with the key engaging the keyway,
the tap chuck being constructed for rigidly mounting a tap received within said passageway,
a handle for rotating the body member and such a tap in alignment with such a workpiece, and
a ratchet on the handle selectively engaging its spline for rotating such a tap in the desired direction.

---

This invention relates to a tapping tool and more particularly to a tapping tool for use with a drill press.

In the machining of small parts or pieces, when it is necessary to provide a tapped hole, it is the usual procedure to mount the workpiece in a fixed position on the movable bed of a drill press. The drill press is then set into operation with the required drill size to drill the desired hole or a series of holes in the workpiece—the bed being moved as required to bring the workpiece into correct drilling position with respect to the drill.

After the required number of holes has been drilled, the workpiece is unsecured from the bed and moved to a tapping location where the workpiece is then again secured in position, usually in a bench vise. A common tapping tool having a handle and the required tap size is then hand-held and progressively rotated in the normal manner until the hole has been tapped.

Such an operation as has normally been practiced is time-consuming in the setting up of the workpiece for drilling on the drill press, and then removing the workpiece to another position where it must again be set up for tapping. Furthermore, the hand-held tapping operation does not ensure a perfectly aligned tap in relation to the workpiece, so that the use of the hand-held tap requires a skilled and experienced operator to properly perform the tapping operation. Maintaining an aligned tap and workpiece is necessary to prevent an offset tap or a loose threading action from being formed.

It is therefore an object of the present invention to reduced the inefficiency and time-consuming procedure of normal tapping operations.

Another object is to eliminate the possibility of misalignment between a tapping tool and the workpiece as commonly encountered in hand-held tapping operations.

A further object of this invention is to provide a tapping tool which is usable with drill presses to efficiently tap a workpiece.

A still further object of this invention is to provide a tapping tool for use with drill presses and wherein a reliable alignment is provided between the tapping tool, and a workpiece.

Other objects and advantages of this invention and a fuller understanding of the nature thereof may be had by referring to the claims and the following detailed description taken in conjunction with the accompanying drawings.

On the drawings:

FIGURE 1 is a schematic illustration of a tapping tool constructed in accordance with the principles of the present invention, the tapping tool operating on a workpiece positioned on a drill press.

FIGURE 2 is an elevational view of the tapping tool illustrated in FIGURE 1.

FIGURE 3 is a partial sectional view taken along section lines III—III of FIGURE 2.

FIGURE 4 is an exploded view illustrating in detail the components of the tapping tool.

FIGURE 5 is a plan view of a tap chuck and tap portion of the tapping tool according to the invention.

FIGURE 6 is a plan view of the tapping tool.

FIGURE 7 is a sectional view taken along the section lines VII—VII of FIGURE 2 and illustrating a ratchet mechanism.

As will be described in more detail, it is contemplated by the present invention to construct a tapping tool with one end which will fit into an existing drill press chuck, and with a second end having a tap securely held therein to engage the workpiece in the same precise alignment as was obtained when using the drill press during the drilling operation.

A handle is connected to the second end of the tapping tool to rotate the tap in the normal tapping manner. In one aspect of the invention a ratchet connection between the handle and the second end allows the handle to rotate the tap in a desired direction, and enables the handle to rotate in the opposite direction relative to the tap.

Referring to FIGURE 1 there is illustrated a tapping tool 10 constructed in accordance with the principles of the present invention and operatively held by a drill press 11 within a drill press chuck 12 for tapping a workpiece 13 held on a bed 14 of the drill press 11. The workpiece 13 is first drilled in the usual manner by the drill press 11 while being held on the bed 14. The drill (not shown) is then removed from the drill press chuck 12, and the tapping tool 10 is inserted into the chuck and the chuck is tightened so that tapping of the workpiece 13 is accomplished without having to remove the workpiece from the bed 14. Also, it may be noted that this arrangement allows a tapping tool 10 with the associated tap 15 to be in perfect alignment with the workpiece 13 so that by progressively rotating the handle 16 in a normal tapping manner the workpiece 13 will be correctly tapped.

FIGURES 2 and 3 show the tapping tool 10 as including a hollow tubular body 18 which has at an end 20 a plunger or guide 22 precisely fitted therein so that the guide 22 can rotate relative to the body 18 in a precise manner. A shaft end 24 of the guide 22 is machined and sized to accommodate the drill press chuck 12.

The sectional view of FIGURE 3 shows the guide 22 as also including a cylindrical guiding section 26 which has a diameter slightly larger than the shaft end 24 and extending to a pair of projecting ledges 28 within the body 18. The diameter of the guiding section 26 of the plunger or guide 22 is precisely machined so as to match with a slight undertolerance the machined and broached inside wall 30 of the body 18. This precise machining of the guiding section 26 and the inside wall 30 provides the required dimensional relationship therebetween so that with the shaft end 24 held securely within the drill press chuck 12, the body 18 can rotate relative to the guide 22 with the longitudinal axes of both the body 18 and the guide 22 being coextensive at all times to ensure proper alignment of the tapping tool 10.

An annular groove 32 serves as a grease or lubricant retainer to maintain the lubricant within the body 18 and along the wall 30. An O-ring type of seal 34 is mounted at one end of the guiding section 26 to prevent the lubricant from escaping the lubricating position between the guiding section 26 and the inside wall 30. In particular, as the body 18 is moved longitudinally with respect to the plunger or guide 22 the O-ring 34 seals the very minute amount of area between the guiding section 26 and the inside wall 30, and the lubricant is forced into and maintained within the annular groove 32.

At a tapping end 36 of the body 18, a tap 38 is rigidly held within a tap chuck 40, with the tap 38 and the tap chuck 40 being keyed within the end 36 between the projecting ledges 28. The tap 38 is of ordinary construction normally used with hand-held tapping tools. An inside wall 42 of the tap chuck 40 is closely machined so as to be only slightly larger than a shaft end 44 of the tap 38. The tap shaft end 44 is thus tightly held within the tap chuck inside wall 42 and a set screw 46 rigidly interconnects and maintains rotational alignment between the tap 38 and the tap chuck 40.

In FIGURE 3 and the exploded view of FIGURE 4 there is shown the tap chuck 40 with a guide portion 48 which is machined with a very small amount of tolerance so as to closely fit within a broached inside wall 50 at the body tapping end 36. The close and precise dimensioning of the diameter of the inside wall 50 and the tap chuck guide portion 48 maintains a longitudinal axis of the tap 38 coextensive along and in alignment with the longitudinal axes of the guide 22 and the body 18.

The tap chuck 40 further includes a key end 52 which tightly sits within a keyway 54 defined by the projecting ledges 28 inside the body 18. The tap chuck 40 is fitted within the inside wall 50 until a shoulder 56 at the bottom of the key end 52 abuts against a bottom 58 of the projecting ledges 28. The key end 52 and the projecting ledges 28 defining keyway 54 thus allow a rigid positionable connection to be maintained between the body 18 and the tap 38. Thus, by virtue of the tight coupling between the key end 52 and the keyway 54, rotation of the body 18 precisely rotates the tap 38 therewith and along the same rotational axis.

A ratchet mechanism indicated generally at 60 enables turning of the handle 16 to rotate the body 18 and the keyed tap 38 in the desired rotational direction. The handles 16 threadably engage a disk 62 which includes a cavity 64. The body 18 has a splined type surface 66 which fits into the disk cavity 64 until the top of the spline 66 abuts a stopping edge 68 defining one end of the cavity 64. The operational connection between the disk 62 and the body 18 is provided by a latching member 70 which includes a projecting catch 72 which engages in one rotational direction the splined surface 66 of the body 18.

The latching member 70 has a table portion 74 which slides within a wall 76 in the disk 62, the wall 76 having a diameter slightly larger than the diameter of the table portion 74. A spring 78 has one end 80 resting on the top surface of the table 74 and another end 82 abutting a back wall 84 of the disk 62. The spring 78 urges the latching member 70 in operational engagement with the splined surface 66 of the body 18.

A protruding portion 86 of the latching member 70 has a smaller diameter than the table portion 74 and it protrudes beyond the circumference of the disk 62. In order to change the direction of rotation of the body 18, there is provided a knob 88 which is secured to the protruding portion 86 by means of a pin 90. A second pin 92 is held within the protruding portion 96 of the latching member 70 and fits within a matching seat 94 on the outer perimeter of the disk 62.

It can be noted from FIGURE 7 that rotation of the handle 16 in a counterclockwise direction urges the projecting catch 72 against a wall 96 of the splined surface 66 to rotate the body 18 and the aligned keyed tap 38 in a counterclockwise direction. Rotation of the handle 16 in a clockwise direction enables an edge 98 of the splined surface 66 to act on a slanting surface 100 to cam the latching member 70 and raise the projecting catch 72 to a disengaging position with respect to the splined surface 66. Thus, the ratchet mechanism 60 permits the handle 16 and the associated disk 62 to be rotated in at least one direction without also rotating the body 18 and the keyed tap 38.

To reverse the ratchet action, the knob 88 is first pulled back in opposition to the spring 78 to lift the projecting catch 72 away from the splined surface 66. The knob 88 is then rotated approximately 180° and released to allow the spring 78 to seat the projecting catch 72 in the splined surface 66. This would allow rotation of the handle 16 in a clockwise direction to also rotate the body 18 and the associated tap 38 in the clockwise direction. Ratcheting action would then be provided by rotating the handle 16 in a counterclockwise direction.

The body 18 is held within the disk cavity 64 by means of a cover plate 102 which has a raised edge 104 matching the splined surface 66 in a tightened position as shown in FIGURE 3. The cover plate 102 is secured to the disk 62 by means of a series of screws 106 passing through a number of apertures 108 in the cover plate 102 to threadably engage the disk 62.

To accommodate various sizes of taps such as the tap 38, a corresponding tap chuck 40 is provided. Thus, when a number of different tap sizes are required for a single workpiece, it is only necessary to replace the tap chuck 40 and associated tap 38 from the tapping tool with the required tap and corresponding tap chuck. This can be accomplished simply by pulling on the tap 38 to remove the tap chuck 40 from the keyway 54 and the broached inside wall 50. A resilient metal ring 110 fits within an annular groove 112 formed in the wall 50. The metal ring 110 provides a slight frictional engagement with the outer surface of the tap chuck 40 to aid in maintaining the tap chuck and the tap within a keyed position in the body 18. However, the ring 110 does not substantially interfere with the removal or replacement of the tap and tap chuck.

Thus, there has been provided a tapping tool which is immediately useful with drill presses to tap a workpiece held on the drill press with precise alignment being maintained between the tap and the workpiece during normal progressive rotation of the tapping tool.

Although the drawings and the specification present a detailed disclosure of preferred embodiments of the present invention, it is to be understood that the invention is not limited to the specific form disclosed, but covers all modifications, changes and alternative constructions falling within the scope of the principles taught by the invention.

I claim as my invention:

1. A tapping tool for use with a drill press in tapping a workpiece held thereon comprising:
   a plunger having a shaft end and a guiding end, said shaft end being rigidly mountable within said drill press;
   a body having a chamber at a first end thereof with an inside diameter slightly larger than the diameter of said plunger guiding end to accommodate with a close fit said plunger guiding end to ensure the rotation of said body in alignment with respect to said plunger, said body also including a keyway;
   a splined surface formed around the outer diameter of said body;
   a tap chuck having a key at one end and a passageway, said tap chuck detachably insertable into said body with said key engaging said keyway;
   said tap chuck being constructed for rigidly mounting a tap received within said passageway;

a handle for rotating said body and such a tap in alignment with such a workpiece; and a ratchet on said handle selectively engaging said spline for rotating such a tap in the desired direction.

References Cited

UNITED STATES PATENTS

| 213,916 | 4/1879 | Martin | 10—150 |
|---|---|---|---|
| 1,010,743 | 12/1911 | Durrenberger | 10—141 |

FOREIGN PATENTS 559,495   7/1958   Canada.

OTHER REFERENCES

Publication: Popular Mechanics, November 1965, p. 193, article entitled, "Spring-Loaded Tapping Center," by Louis Owen.

FRANCIS S. HUSAR, *Primary Examiner.*